US009772498B2

(12) United States Patent
Kowasic

(10) Patent No.: US 9,772,498 B2
(45) Date of Patent: Sep. 26, 2017

(54) MAGNIFIED SCREEN COVER PROTECTOR FOR ELECTRONIC DEVICES

(71) Applicant: Dana Conrad Kowasic, Cross Junction, VA (US)

(72) Inventor: Dana Conrad Kowasic, Cross Junction, VA (US)

( * ) Notice: Subject to any disclaimer, the term of this patent is extended or adjusted under 35 U.S.C. 154(b) by 179 days.

(21) Appl. No.: 14/303,978

(22) Filed: Jun. 13, 2014

(65) Prior Publication Data

US 2015/0362736 A1   Dec. 17, 2015

Related U.S. Application Data

(60) Provisional application No. 61/923,714, filed on Jan. 5, 2014.

(51) Int. Cl.
| | | |
|---|---|---|
| *G02B 27/22* | (2006.01) | |
| *G02B 27/02* | (2006.01) | |
| *G02B 1/14* | (2015.01) | |
| *G02B 1/18* | (2015.01) | |
| *G02B 1/11* | (2015.01) | |

(52) U.S. Cl.
CPC ............ *G02B 27/027* (2013.01); *G02B 1/14* (2015.01); *G02B 1/18* (2015.01); *G02B 1/11* (2013.01)

(58) Field of Classification Search
CPC .... G02B 27/2292; G02B 27/027; G02B 1/18; G02B 1/14; G02B 1/11; G02B 3/08; G02B 25/002; G02B 1/105; G02B 25/005; G02B 27/0006; G09F 23/00; B32B 7/12; B32B 27/00; C09J 7/0264

USPC ............... 359/478, 479, 507, 511–514, 742; 351/69, 70, 79; 313/408, 429, 489; 345/581; 348/14.07, 63, 358, 818, 819, 348/823
See application file for complete search history.

(56) References Cited

U.S. PATENT DOCUMENTS

| | | | | |
|---|---|---|---|---|
| 9,069,189 | B2 * | 6/2015 | Shalon | A45C 11/04 |
| 2011/0299168 | A1 * | 12/2011 | Combs | G02B 1/11 |
| | | | | 359/601 |
| 2012/0070603 | A1 * | 3/2012 | Hsu | B32B 7/12 |
| | | | | 428/41.8 |

\* cited by examiner

*Primary Examiner* — Scott J Sugarman
*Assistant Examiner* — Mustak Choudhury

(57) ABSTRACT

The present invention is a magnified screen cover and protector for electronic devices. The invention comprises a magnified surface layer with a top protective layer and a bottom adhesive layer. The invention magnifies the screen of an electronic device with diopter and/or magnification power ranges so that the user may comfortably use the electronic device without the aid of wearing prescription eyewear, contact lenses, reading glasses or other visual aids. The touch screen sensitivity and functionality of the electronic device is unaffected by the magnified screen cover protector, so usability of the electronic devices touch and sensitivity functions are not compromised. The present inventions additional benefit is protecting the glass and/or plastic surface of an electronic devices main viewing screen from scarring, shattering, debris and breakage. Other embodiments of the magnified screen cover protector would include a three dimensional (3D) magnification layer for viewing text images, and video in a three dimensional (3D) visual simulation on an electronic devices screen.

1 Claim, 4 Drawing Sheets

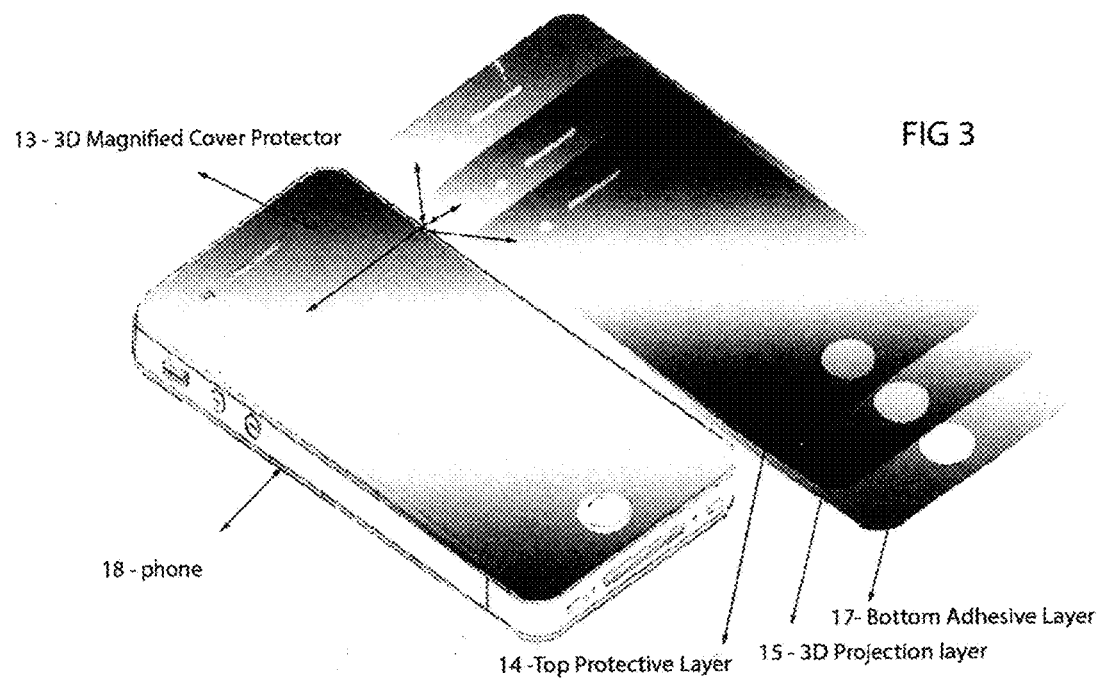
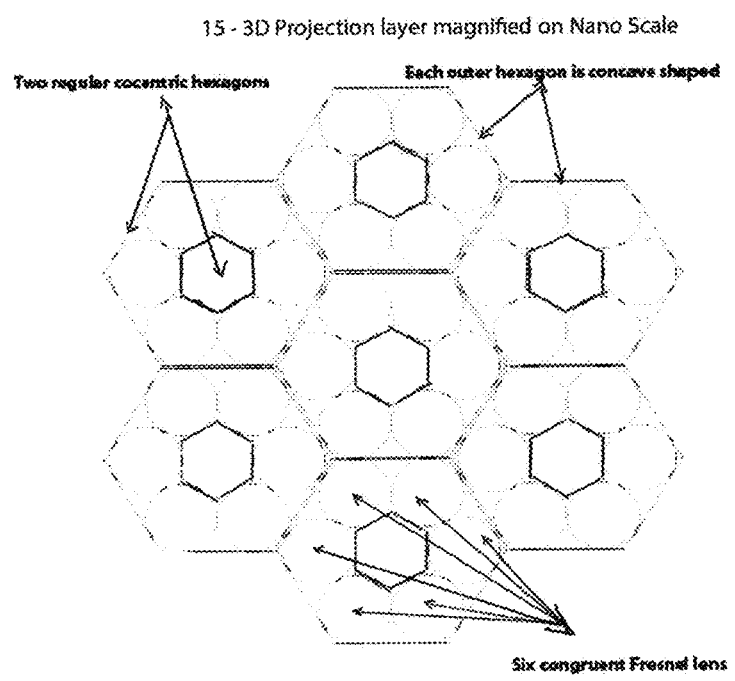

MAGNIFIED SCREEN COVER PROTECTOR FOR ELECTRONIC DEVICES

CROSS-REFERENCE TO RELATED APPLICATIONS

This application claims the benefit of U.S. Provisional Application No. 61/923,714 filed on Jan. 5, 2014 entitled "Magnified Screen Cover Protector for Electronic Devices."

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is in the technical field of magnification. More particularly, the present invention is in the technical field of screen magnifiers. More particularly, the present invention is in the technical field of magnified screen covers. More specifically, the present invention is in the technical field of a magnified screen cover combined with a screen protector for electronic devices. The present invention provides a user with a transparent screen cover for an electronic devices screen that protects it from scratches, breakage, dirt and debris combined with offering diopter and/or magnification power ranges for viewing of underlying text and images just like a pair of reading glasses, bifocal/progressive leases or contact lenses.

With the advent of computer technology, electronic devices such as/but not limited to the smartphone, tablet computer and laptop computer, many individuals are having an increasingly difficult time reading the small text and objects up close on their electronic devices screen. These devices were designed for compactness so that they may be stored in a pocket, purse or backpack. The small size of most handheld electronic devices necessitates the use of very small screen displays. These digital displays which can be touchscreen oriented, facilitates the control of the electronic device by displaying text commands, icons, images and options to a user. People who cannot clearly see text, and objects upfront on their electronic devices screen without physically wearing prescription bifocal/progressive lenses, contact lenses, or reading glasses usually continue to struggle to see without some form of visual aid. These people with vision impediments either already have prescription bifocal/progressive lenses, contact lenses or they go to the bookstore/drug store to purchase reading glasses for their near sightedness and/or other visual handicaps. For the visually impaired, controlling and using electronic devices can be increasingly difficult, especially when using one hand to execute functions on their devices.

2. Description of the Prior Art

Common visual aids include hard magnifying lenses, flexible magnifying sheets (page readers) and digital magnification devices. These visual aids are clunky, hard to maneuver, or would require the user to hold the portable device is one hand and the visual aid in the other, leaving the user less capable of actually controlling the device or conducting another simultaneous activity. A lightweight, unobtrusive screen magnification device is needed to assist users with the control, and magnification of portable handheld and wearable electronic devices.

The prior art contains a variety of cellphone covers that provide magnification of a screen or keypad. These devices have familiar design elements for the purpose of magnifying components of a smart phone; however they are not adapted for the task of providing a user with a customizable diopter and/or magnification power range all while protecting a display screen from scratches, breakage and debris.

Some cases use a different process for creating magnification such as Robinson, U.S. Patent application Publication. No. 2012/0243110, which describes being constructed of a thin transparent material such as plastic. The front surface of the device is formed in the shape of a Fresnel Lens having numerous concentric and annular sections. A user can adjust the power of the magnification by changing the offset distance between the lens and the display screen. The farther the lens is moved from the display screen, the larger the underlying image becomes, as seen through the lens. Robinson's case using a Fresnel Lens stipulates that in order to magnify in different strengths the user has to increase the distance between the lens and the display screen by users stacking components on to the frame of the electronic devices screen. Once the desired height is reached the magnified screen cover is installed on top of the stacked components. This approach is cumbersome, with increased magnification the lens and stack would grow taller in structure. In real world applications, Robinsons taller thicker multi-pieced magnified screen cover would be orthopedic looking and prone to come apart or not be installed as a semi-permanent or permanent solution. People around the world generally use Presnel lens page readers to provide magnification of print media such as newspapers, magazines, etc. The present invention, uses technology similar to contact lenses, progressive lenses and reading glasses in which we are putting a magnified cover protector on to the electronic devices screen in a semi-permanent/permanent installation. The present invention would offer customized diopters and magnification powers ranges built within the screen protector. This installation would be thin, compact and not noticeable, just like any available screen protector on the market except with the additional feature of being magnified to a specific strength for the personalization of the end user.

The prior art also contains screen magnifying devices that cover just the screen area on a smartphone, rather than housing a portion of the device. Bartone, U.S. Pat. No. 6,985,311 discloses a magnifying window for a flip-top cellphone. The window comprises a magnification film secured within a plastic frame. The frame is secured to the top of the cellphone by extendable arms. A user can extend the arras to position the magnification window at a desired distance away from the phone screen. When the phone is closed, the arms collapse to flatten the device against the cellphone. Another such device is disclosed by Shaffer, U.S. Pat No. 6,275,333. Shaffer contemplates a magnification window removably secured to a cellphone by a strap that wraps horizontally around the phone. The window has a slot on one side that is adapted to receive and retain a set of vertically stacked magnification slides. The slides may be inserted or removed to adjust magnification of objects on the phone screen. Neither the magnification, window nor the slides is directly secured to the screen of the phone. The devices of Bartone and Shaffer do not disclose an adhesive magnifier that protects a display screen from dirt and debris.

The present invention provides a film/glass screen, that secures directly to the screen of a portable electronic device and therefore offers screen protection in addition to personalized magnification powers.

The devices disclosed by the prior art do not address the need for customizable diopter and/or magnification powers ranges as with the present invention all while also protecting the display screen from scratches, breakage, debris and may be used with a variety of display types. The device disclosed by Robinson uses a Fresnel lenses to magnify the screen of the electronic device, thus limiting the clarity of the viewing screen with its numerous concentric and annular sections. The Robinson device disclosed by the prior art has to be moved to adjust the power of the magnification by changing, the offset distance between the lens and the display screen or by stacking spacer components to achieve the proper magnification power level for the user. Stacking spacer components in between the electronic devices screen and the Fresnel lens could create a larger orthopedic look to a personal electronic device. Stacking spacers in between the screen, and the magnifying screen cover would also severely limit the user functional properties of most touch screen enabled electronic devices since the magnification screen would not be directly touching the screen surface of the electronic device. The present invention would be a whole transparent, thin screen protector and would come in a variety of diopter ranges and/or magnification powers built directly into the screen protector as to create a unique personalization to the end users of an electronic device. The present invention would not have to be moved or have spacers stacked to adjust magnification. Since the present invention would be installed directly onto the electronic devices screen, the touchscreen properties and functionality of the device would not be compromised. It substantially diverges in elements from the prior art, consequently it is clear that there is a need in the art for an improvement to the known types of electronic device screen accessories. In this regard the instant invention substantially fulfills these needs.

SUMMARY OF THE INVENTION

The present invention is a magnified screen cover protector. The present invention is a magnified screen cover protector for users to view text images, and video on electronic devices such as/but not limited to: smartphones, tablet computers and laptop computers. The present invention is installed on top of the electronic devices screen. The magnified screen cover protector is whole transparent enabling magnified viewing of the devices screen while enabling full functionality of the electronic devices touch screen properties without compromise. The present invention would be offered in different diopter and/or magnification power ranges so that the end user would have a device screen that could be personalized to their individual visual needs. Additionally, the magnified screen cover protector would protect the electronic devices screen from cracking, scratches, debris and breakage.

Suitable Products:
1. Magnified screen cover protector for mobile phone/smartphone.
2. Magnified screen cover protector for laptop/notebook/tablets/computer/PDA.
3. Magnified screen cover protector for GPS/PSP/TV/E-book reader.
4. Magnified screen cover protector for camera.
5. Magnified screen cover protector for TV.
6. Magnified screen cover protector for MP3/MP4/iPod.
7. Magnified screen cover protector for DC/DV.
8. Magnified screen cover protector for google glass/wearable computers and electronic devices.
9. Magnified screen cover protector for Oculus and other wearable VR (Virtual Reality) devices.

It is therefore an object of the present invention to provide a new and improved electronic device screen magnifier having all the advantages of the prior art and none of the disadvantages.

Another object of the present invention is to provide a new and improved electronic device screen magnifier having a self-adhesive coating so that the magnifier may be removably secured directly to the surface of a display screen.

Still another object of the present invention is to provide a new and improved electronic device screen magnifier for magnifying the image depicted on a digital or analog display.

A further object of the present invention is to provide a new and improved electronic device screen magnifier that protects a display screen from scarring, breakage, and the accumulation of dust and debris.

A still further object of the present invention is to provide anew and improved electronic device screen magnifier that offers customizable diopter and/or power of magnification.

A final object of the present invention is to provide a new and improved electronic device screen magnifier having resilient and durable construction.

Other objects, features and advantages of the present invention will become apparent from the Following description taken in conjunction with the accompanying drawings.

BRIEF DESCRIPTION OF THE DRAWINGS

FIG. 3 is a top view of a smartphone with a cut out view of the three layers of the present invention

DETAILED DESCRIPTION OF THE INVENTION

Figure 1:
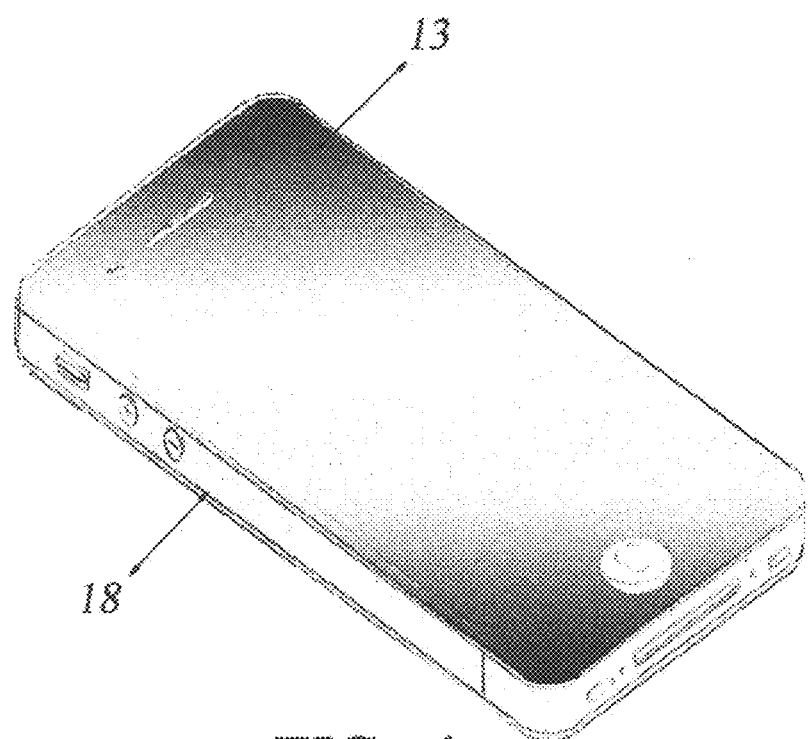
FIG. 1 is a top view of a smartphone magnified screen cover protector example of the present invention.

Reference is made herein to the attached drawings. Like reference numerals are used throughout the drawings to depict like or similar elements of the electronic device screen magnifier. For the purposes, of presenting a brief and clear description of the present invention, the preferred embodiment will be discussed as used for magnifying the images depicted on a display as well as protecting the display from scratches, dirt, debris and breakage. This is for representative purposes only and should not be considered to be limiting in any respect.

Referring now to FIG. 1, there is shown a preferred embodiment of the magnified screen cover protector 13 installed on top of the display of a smartphone 18. The magnified screen cover protector 13 is made from a transparent material and has a front surface and a rear surface forming a semi-flat region there in between. This region can be shaped like a rectangle, a circle or other geometric figure that may conform to the boundaries of the electronic devices screen. The size and dimension of the sheet may vary to accommodate the screens of electronic devices such as cellphones, smartphones, PDA's, tablet computers, GPS, TV's, portable video game systems, watches, wearable computers and the like.

Figure 2:
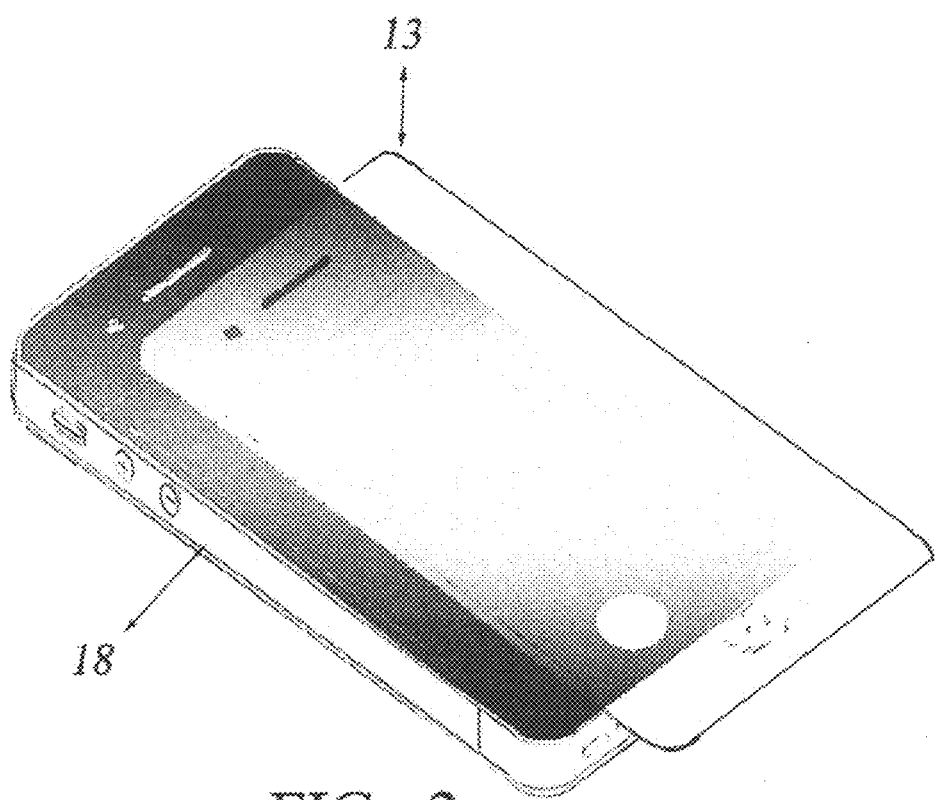
FIG. 2 is a top view of a smartphone magnified screen cover protector example of the present invention with the magnified screen cover protector detached, and just above the smartphone

Referring now to FIG. 2, there is shown the magnified screen cover protector 13 just above the display of a smartphone 18. The magnified screen cover protector 13 is whole transparent.

Referring now to FIG. 3, there is shown the embodiment, of the magnified screen cover protector 13 installed on top of a smartphone 18 with a dissected side view of the three sections of the present invention (dark shading of the present invention is used for illustrative purposes). The rear surface layer 17 of the magnified screen cover protector 13 has a coating of adhesive. In production of the device, a removable backing may be affixed to the rear surface of the device to protect the adhesive coating prior to its use. The backing is removed to expose the adhesive when an individual is ready to apply the sheet to a screen. A user affixes the magnifying sheet to a display by aligning the sheet with the display then gently pressing downward on the sheet. When the device is firmly in place, it provides protection to me associated display screen by acting as a barrier against dirt and debris. The device also reduces the likelihood that the display will be scratched or broken. In this way, the magnified screen cover protector 13 also functions as a screen protector for the electronic device or other display. The screen protection capability will be useful to people who place their electronic devices in a hand bag or pocket, where it can be easily scratched by other objects. The magnified surface layer 16 provides the diopter and/or magnification power range for magnifying the surface of the electronic devices screen. This magnified surface layer 16 enhances the view of the electronic devices screen to which users can comfortably view text, images and video on the screen of the electronic device without the aid of external eyewear, contacts and other visual aids. Just like reading glasses or prescription eyewear this transparent magnified surface layer 16 is made is many different magnifications to suit the individual needs of the user. The top protective surface layer 14 is whole transparent and provides protection for the electronic devices screen from scarring, breakage, fingerprints, and debris.

Figure 4:
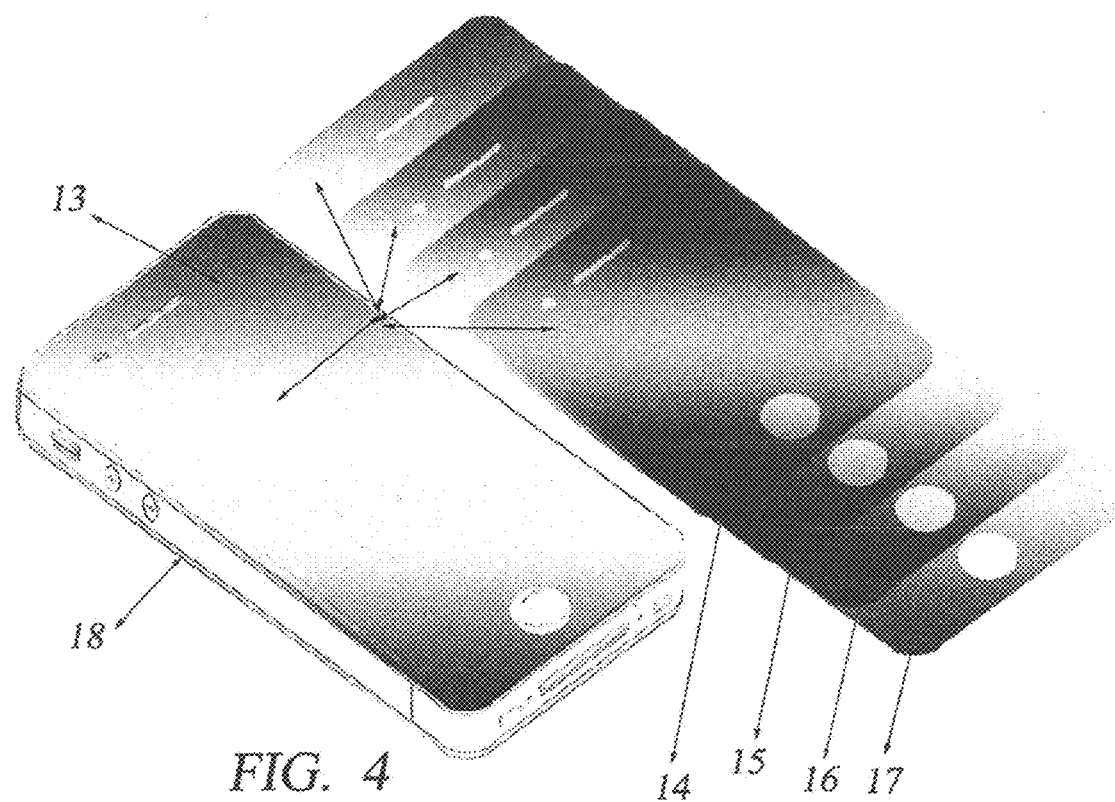
FIG. 4 is a top view of a smartphone with a cut out view of the four layers of the present invention with a three dimensional (3D) layer included.

Referring now to FIG. 4, there is shown the embodiment of the magnified screen cover protector 13 installed on top of a smartphone 18 with a dissected side view of the four sections of the present invention (dark shading of the present invention is used for illustrative purposes). The three layers 14, 16, 17 described in FIG. 3 apply to FIG. 4, in the same functional capacity. An additional three dimensional (3D) layer 15 provides for three dimensional (3D) projection of the text, pictures and video on an electronic devices screen. In this embodiment the three dimensional (3D) layer is whole transparent and provides an additional function, to the magnified screen cover protector 13.

In many embodiments my invention would be installed on top of the screen of any smartphone, tablet, computer, laptop, camera, TV, E-Book reader, GPS/PSP, iPod, and wearable VR device. The magnified screen cover protector would be available in abroad diopter and/or magnification power range just like contacts, bi-focal/progressive lenses and reading glasses. The present invention could use materials similar to contact lens technologies such as PMMA (para-methoxymethamphetamine), RGP (rigid gas permeable) lens, IOL (intraocular lens), Phema (polyhydroxyethymethacrylate) but not limited to these materials. The present Invention would offer diopters in ranges from −50.0 to +50.0 with Myopia (−0.75 to −10.00) Hyperopia (+0.75 to +4.00) Astigmatism (+/−0.75 to +/−4.00) and/or magnification ranging from +0.005 to +100.0 ranges with +1.25 to +1.50 being mild strength, +1.75 to +2.00 as medium strength and +2.25 to +2.75 being strong strengths just like reading glasses. Customers could choose their strengths by the diopter or magnification power and personalize their electronic device to their own individual needs by making the present invention a customized solution just like reading glasses, bifocal, progressive lenses or contact lenses. The present invention could be-marketed individually by diopter just like prescription eyewear or by a magnified powers like regular reading glasses available in most stores with mild, medium, and strong strengths. This magnified screen cover protector would enable the user to be able to view the electronic devices screen without physically wearing external prescription eyewear, contacts lenses or reading glasses all while maintaining the use of the electronic devices touch, screen properties and/or functionality without any limitations. In this embodiment the entire surface of magnified screen cover protector is whole transparent but not limited to any particular materials, the back side is covered with special self-absorbed silicone or similar materials for easy-fast installation and without air bubbles. When installed on top of the electronic device's screen there are no gaps between the electronic devices screen and the magnified screen cover protector. The touch screen sensitivity and functionality of the electronic device is unaffected. Anti-shatter, shock absorption film or similar materials are adhered to the magnified screen cover protector for protecting the electronic device's screen, from collision and damage. The back side adhered with anti-shatter film or similar materials that provide the same benefit.

In another embodiment my invention would be whole transparent glass and/or plastic but not limited to any particular materials, installed on top of the electronic device's screen, but used in conjunction with a protective outer shell case designed for a particular electronic device, the shell case would keep the magnified screen cover protector in the proper alignment on top of the electronic devices screen. Touch screen sensitivity and functionality of the electronic device is uncompromised. Anti-shatter, shock absorption film or similar materials are adhered to the magnified screen cover protector for protecting the electronic device's screen from collision and damage. The back side adhered with anti-shatter film or similar materials that provide the same benefit.

In another embodiment, the present inventions functional design capability would also include the ability to project the electronic devices screen viewing surface in a three dimensional (3D) viewing format in combination with magnifying the viewing screen display in a diopter and/or magnification power scheme for people with a visual imparity.

In broad embodiment, the present invention is a magnified screen cover protector that is whole transparent and adheres to or is placed on top of the screen of a personal electronic device. The advantages of the present invention include, without limitation, the ability to view the screen of an electronic device such as/but not limited to smartphones, tablet computer and laptop computers without the need to physically wear corrective eyewear to see the text, objects, or video up close while also being able to use tire full functionality and sensitivity of the electronic device's touch screen surface as an input device without limitations. Additionally, the magnified screen, cover protector would protect the electronic devices screen from cracks, scratches, debris and breakage.

While the foregoing written description, of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Having described my invention, I claim:

1. A three dimensional (3D) magnified projection screen cover protector, comprising: a three dimensional (3D) projection magnified surface layer, a top surface layer and a bottom surface layer, wherein said surfaces define a geometrically shaped area; said three dimensional (3D) magnified protection surface layer being translucent and embedded with plurality of concave hexagon shaped nano Fresnel lenses each consisting of two regular concentric hexagons with six congruent Fresnel lens circles placed so that they are tangent to each other and both inner and outer hexagons, this alignment will create and protect three dimensional (3D) viewing of a two-dimensional (2D) image without the use and/or involvement of additional exterior three-dimensional (3D) projection components, enhanced images or movie film; said three dimensional (3D) magnified protection surface layer's nano hexagon Fresnel lenses produced with various diopter powers for customization of the magnification of the projection of an image or movie film; said top layer being formed of a transparent material that provides anti-s hatter, anti-scarring, anti-glare, and anti-fingerprint protection elements and technologies; said bottom surface layer being formed with a transparent adhesive on a transparent base.

* * * * *